United States Patent [19]
Woodward

[11] Patent Number: 5,501,518
[45] Date of Patent: Mar. 26, 1996

[54] HAND-HELD KEYBOARD TESTER

[75] Inventor: James S. Woodward, Austin, Tex.

[73] Assignee: Dell USA, L.P., Austin, Tex.

[21] Appl. No.: 189,225

[22] Filed: Jan. 31, 1994

[51] Int. Cl.⁶ .................................................. G06F 11/22
[52] U.S. Cl. .................. 364/551.01; 364/552; 371/20.4; 235/145 R
[58] Field of Search ................................. 371/16.1, 21.1, 371/15.1, 20.4; 364/552, 551.01; 324/763; 235/145 R

[56] References Cited

U.S. PATENT DOCUMENTS

| | | | |
|---|---|---|---|
| 3,768,622 | 10/1973 | Wood | 73/865.9 |
| 4,489,414 | 12/1984 | Titherley | 371/21.6 |
| 4,837,764 | 6/1989 | Russello | 371/16.1 |
| 4,964,124 | 10/1990 | Burnett | 371/15.1 |
| 5,353,240 | 10/1994 | Mallory et al. | 364/552 |

Primary Examiner—Emanuel T. Voeltz
Assistant Examiner—Thomas Peeso
Attorney, Agent, or Firm—Henry Garrana; Michelle Turner

[57] ABSTRACT

A hand-held keyboard test unit includes an enclosure that fits easily within one hand, a keyboard connector for receiving a keyboard connector, a controller programmed solely to execute tests of the keyboard, a digital display to indicate the status of the test and provide instructions to the test unit operator, and a switch to initiate the test sequence. The controller causes the keyboard to execute its self-test routines, transmits and verifies responses to standard system unit commands to the keyboard, and conducts a key closure test for each key on the keyboard.

13 Claims, 12 Drawing Sheets

HAND-HELD KEYBOARD TESTER

BACKGROUND OF THE INVENTION

The present invention relates generally to personal computers and more particularly to keyboards designed for use with personal computers. Still more particularly, the present invention relates to a hand-held, self-contained test unit that connects directly to a 101-key type MF-II enhanced keyboard designed for use with personal computers.

The manufacture and sale of personal computers is increasingly a competitive business. Manufacturers strive constantly to design and build personal computers with ever greater processing capabilities and features at lower costs. At the same time, however, stringent quality control is absolutely essential. Excellent processing capabilities and numerous features are more than offset in the marketplace by a reputation for poor quality control. Thus, manufacturers endeavor to provide the best possible quality control at the least possible expense for each part of the personal computer system.

The keyboard is an essential part of a personal computer system, receiving keystrokes and passing information to the system unit about keys being pressed or released. Its operation centers around a microcontroller, typically an Intel 8042 or 8742 microcontroller or equivalent device from another manufacturer. The microcontroller executes five basic functions within the domain of the keyboard. The first of these five functions involves the performance of certain internal tests, including the generation of a power-on reset (POR) signal and a basic assurance test (BAT), which checks the keyboard microcontroller, read-only memory (ROM), and random access memory (RAM). The second function involves assuring the limited programmability of certain keys. The third function relates to conducting key position scanning and recording. The fourth function involves serial data communication with the system unit, the fifth function relates to the typematic function of the keys, and the sixth function relates to LED status indication. The ability of the keyboard microcontroller to execute each of these functions is critical to the operation of the keyboard and the personal computer as a whole.

Some personal computer manufacturers make their own keyboards; others buy keyboards from another manufacturer and package it as a part of their computer products. In either case, quality control of the keyboard itself is an important consideration. Keyboard manufacturers must verify that the assembled keyboards are in good working order before being packaged with their own computer systems or sold and shipped to another manufacturer. Those purchasing keyboards from another manufacturer must verify that the keyboard is received in good working order before packaging it as a part of their own system.

Typically, keyboard testing has involved connecting the keyboard to a personal computer, booting up the computer, loading a diagnostics program, and checking to see if the keyboard operates as expected. Such testing, however, is inefficient for several reasons. First, dedicating entire personal computers solely for the purpose of testing keyboards is expensive. Second, the process of connecting a keyboard to a personal computer, booting up the computer, and loading the diagnostic software is time consuming. Third, a personal computer is bulky and not easily transported, requiring that a particular space be dedicated for the computer equipment and that the testing process be centered around the area containing this equipment.

Hence, it would be advantageous to devise a keyboard test unit that is simple, compact, and relatively inexpensive and yet capable of fully testing the functional capabilities of a keyboard.

SUMMARY OF THE INVENTION

Accordingly, there is provided herein a hand-held keyboard test unit capable of testing the functional capability of computer keyboard. The test unit preferably includes an enclosure small enough to hold in one hand, less than approximately sixty cubic inches in volume, for example, a keyboard connector jack attached to the enclosure, and a controller housed within the enclosure, the controller being programmed solely to execute functional tests of the keyboard.

The hand-held test unit may also include a four-character display for indicating the status of the test sequence and for issuing instructions to the operator, a switch on a face of the enclosure for initiating a test sequence, a power adapter for converting line voltage to direct current power for the test unit, and a power-on LED to indicate that power is being supplied to the controller.

The controller preferably is programmed to execute several types of keyboard tests. First, the controller causes the keyboard to execute its internal self-test routines and verifies receipt of the code indicating successful completion of these routines. Then the controller causes the keyboard to execute a series of commands ordinarily sent by a system unit of a personal computer to the keyboard. These commands include, for example, the RESEND command, the DEFAULT command, the DISABLE command, the ENABLE command, the SET TYPEMATIC command, the READ ID command, and the SET INDICATOR command. Transmission of each of these commands is followed by verification of the proper response from the keyboard. Finally, the controller conducts a key closure test for each of the 101 keys on the keyboard by directing the operator to a particular key and verifying receipt of the proper key-make and key-break codes.

Thus, a keyboard test unit constructed in accordance with the principles of the present invention is simple, compact, and relatively inexpensive and yet capable of fully testing the functional capabilities of the keyboard. These and other characteristics and advantages of the present invention will become readily apparent to those skilled in the art upon reading the following detailed description and claims and by referring to the accompanying drawings.

BRIEF DESCRIPTION OF THE DRAWINGS

For a more detailed description of the preferred embodiment of the invention, reference will now be made to the accompanying drawings, wherein:

FIGS. 3A–3J depict a flow chart describing the method of operation of the microcontroller depicted in FIG. 2.

DESCRIPTION OF THE PREFERRED EMBODIMENT

Manufacturers typically use personal computers to execute functional tests on keyboards prior to packaging the keyboards in a computer system for sale to consumers.

Personal computers used to test keyboards have the disadvantages of being relatively expensive, bulky, and time-consuming in that for each keyboard, after the keyboard is connected to the computer, the computer must be booted up and the diagnostic software loaded for execution.

The present invention provides a relatively simple, hand-held device that is compact and readily portable. Because it employs an inexpensive microcontroller fully capable of functionally testing the keyboard, rather than an Intel 80286, 80386, or 80486 microprocessor, it is substantially less expensive than a personal computer. Furthermore, because the device is dedicated solely to keyboard testing, it is ready to commence testing immediately upon connection of the keyboard.

Figure 1:
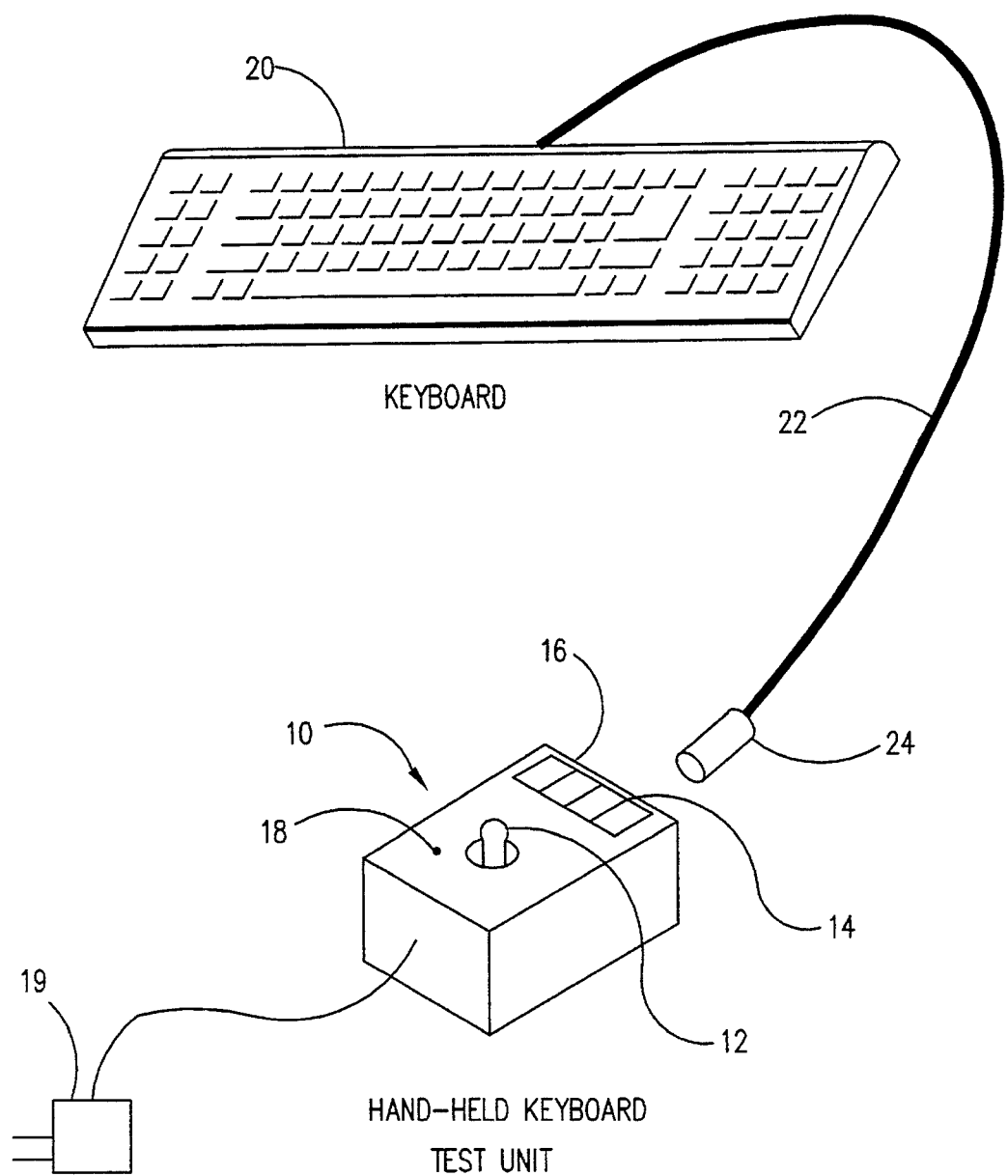
FIG. 1 is a perspective view of a keyboard and a hand-held keyboard test unit constructed in accordance with the principles of the present invention.

Referring now to FIG. 1, a hand-held keyboard test unit 10 constructed in accordance with the principles of the present invention comprises a generally rectangular, box-like enclosure having dimensions that make it suitable for holding in the palm of one hand. The enclosure may preferably be, for example, six inches long by three inches wide by two inches deep, for a total enclosure volume of thirty-six cubic inches. The test unit preferably weighs approximately one-half pound, its size and weight thus making it readily hand-held and easily portable.

The top face of the test unit 10 includes a push-button, momentary closure switch 12 for initiating the test sequence, as described in detail below, a four-character digital display 14 for indicating the status of the test and for providing instructions to the test operator, also as described in detail below, and a power-on LED 18. The test unit 10 preferably further includes a power adapter 19 for converting 120-volt line alternating current to five-volt direct current to power the test unit 10.

FIG. 1 also depicts, for illustration purposes, a typical 101-key type MF-II enhanced keyboard 20 such as might be connected to the test unit 10 for testing purposes. The keyboard 20 includes a cable 22 with a standard keyboard connector 24 on the end thereof. The test unit 10 includes on an end face 16 thereof a standard PS2 keyboard connector jack (not shown) for receiving the connector 24.

Generally, an operator carries out the test operation simply by plugging the keyboard cable connector 24 into the corresponding jack in the test unit 10 and pressing the push-button switch 12 to initiate the test sequence. As explained below in the section entitled "Method of Operation," the test unit then executes a series of tests, including causing the keyboard to execute the basic assurance test (BAT) and transmitting to the keyboard each of the principal system to keyboard commands and checking to see that the keyboard responds accordingly.

After the initial tests are completed, the test unit 10 commences a key closure test by instructing the test operator to press in sequence each key on the keyboard and checking in each instance for transmission by the keyboard of the appropriate key-make code and key-break code generated by the keyboard. If the keyboard responds properly to each test, the operator receives an "OK" signal on the digital display 14. If the keyboard fails to respond properly to any test, the operator receives a "Fail" signal on the digital display 14, and the test sequence terminates.

Test Unit Electronics

Figure 2:
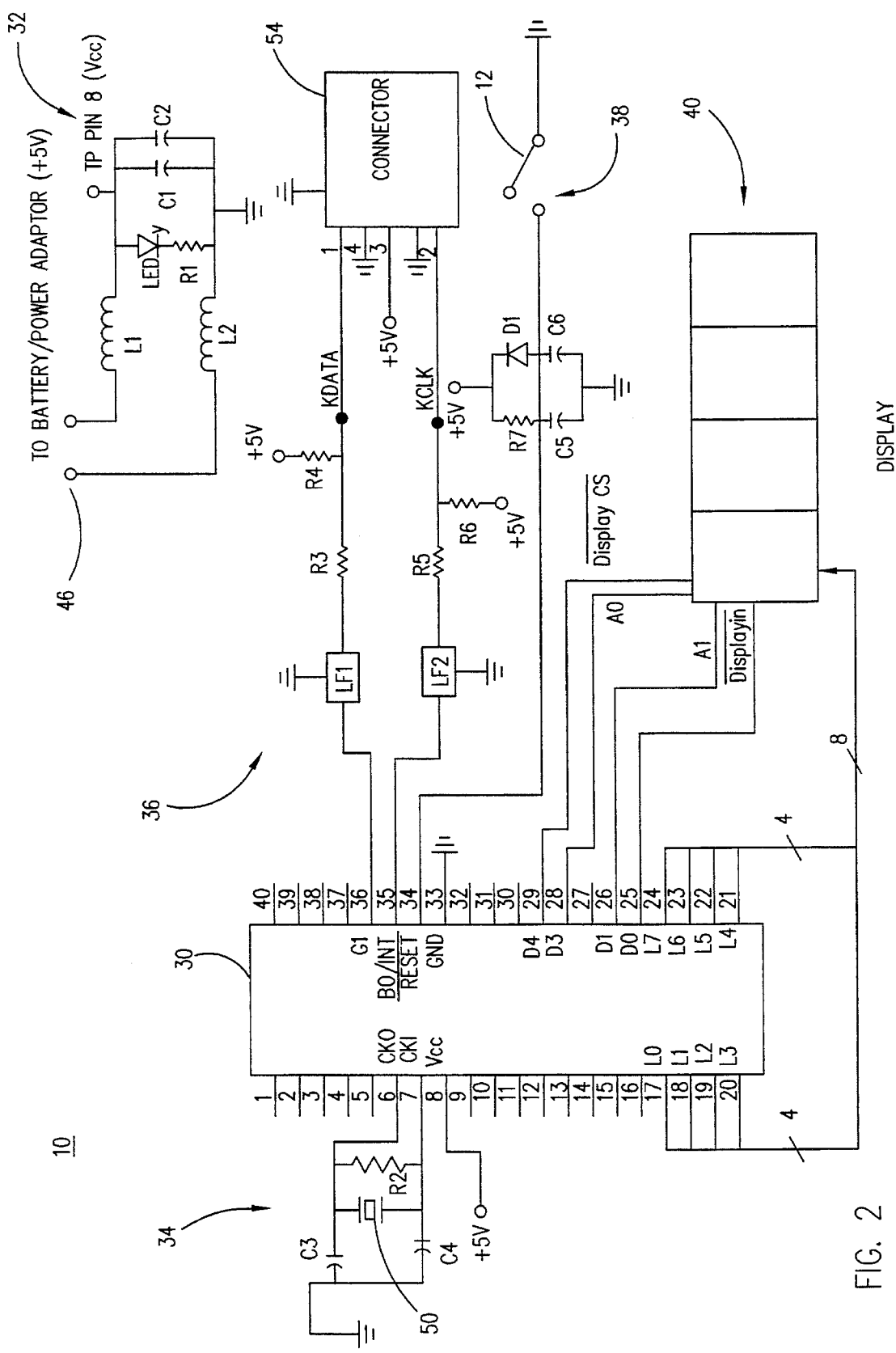
FIG. 2 depicts a schematic diagram of the electrical circuit for the hand-held keyboard test unit depicted in FIG. 1.

Referring now to FIG. 2, the electrical circuit for the test unit 10 includes five separate circuits connected to a microcontroller 30. The microcontroller 30 preferably is a COP8780 single-chip microcontroller manufactured by National Semiconductor, but may comprise any of a series of microcontrollers and microprocessors having the capabilities described herein. The five circuits connected to the microcontroller include a power circuit 32, a clock circuit 34, a connector circuit 36, a reset circuit 38, and a display circuit 40.

The power circuit 32 supplies a five-volt direct current power to the microcontroller 30 at pin 8 thereof. The power source for the power circuit 32 is connected at 46 and may comprise either a battery or an adapter, available from any of several well-known sources, designed to convert 120-volt line alternating current to five-volt direct current. In this manner, the test unit 10 can be operated by battery or by plugging the adapter into a nearby electrical outlet, if available. The preferred electrical components comprising the power circuit 32 and their specifications, as well as the components comprising the other four circuits and their specifications, are indicated in Table I below.

The clock circuit 34 preferably comprises a 9.6 MHz crystal oscillator 50 connected across pins 6 and 7 of the microcontroller 30.

The connector circuit 36 comprises the circuit connecting the PS2 keyboard connector jack 54 to pins 35 and 36 on the microcontroller 30.

The reset circuit 38 comprises the circuit connecting the momentary closure push-button type switch 12 to pin 34 on the microcontroller 30. The switch 12 generates a reset signal to the microcontroller 30, causing the microcontroller to initiate a test sequence.

The display circuit 40 comprises the circuit connecting the microcontroller 30 to a four-character, dot matrix display, specification no. HPLG2416, manufactured by Hewlett Packard or Siemens.

TABLE I

| Element Symbol | Element Type | Specification |
| --- | --- | --- |
| C1 | capacitor | 22 µf |
| C2 | capacitor | 22 µf |
| C3 | capacitor | 22 pf |
| C4 | capacitor | 22 pf |
| C5 | capacitor | 0.001 µf |
| C6 | capacitor | 22 µf |
| D1 | diode | 1N4148 |
| L1 | inductor | 82 µh |
| L2 | inductor | 82 µh |
| LF1 | line filter | 330 pf center tap |
| LF2 | line filter | 330 pf center tap |
| R1 | resistor | 220 Ω, ¼ w, 10% |
| R2 | resistor | 1.0 MΩ, ¼ w, 10 |
| R3 | resistor | 47 Ω, ¼ w, 10% |
| R4 | resistor | 2.7 KΩ, ¼ w, 10% |
| R5 | resistor | 47 Ω, ¼ w, 10% |
| R6 | resistor | 2.7 KΩ, ¼ w, 10% |
| R7 | resistor | 56 KΩ, ¼ w, 10% |

Method of Operation

Referring now to FIGS. 3A through 3J, the flow chart depicted therein describes the method of operation of the COP8780 microcontroller that controls operation of the test unit. Based on the information set forth in the flow chart and the information included herein, an engineer or programmer having ordinary skill in the art of computer programming could write the computer code necessary to perform the method described herein.

Step 60 (FIG. 3A) is the first step of the method of operation and represents the point at which power is initially applied to the microcontroller, or alternatively, if power has already been applied, the point at which the microcontroller receives a reset signal as described above.

In step 62, the microcontroller ("KBTester") initializes its registers, ports, and interrupts for the operations that follow. The preferred code for initializing the COP 8780 described herein is as follows:

```
LD      SP,#06F
LD      B,#PORTGC
LD      [B−],#080
LD      [B],#03C
LD      PORTLC,#OFF
LD      PORTLD,#OFF
LD      PORTCC,#000
LD      PORTCD,#000
LD      PORTGC,#000
LD      PORTGD,#03C
LD      CNTRL,#04
LD      PSR,#0
SBIT    Clock1,PORTGC
RBIT    Clock1,PORTGD
```

In step 64, the microcontroller loads the word "Test" into the four-character display and then waits approximately 500 msec to insure that the keyboard has completed its internal test routines activated on power-up (POR and BAS). In step 66, the microcontroller pulls the KCLK line (see FIG. 2) low to prevent the keyboard microcontroller from attempting to transmit data to the test unit. Then, in step 68, the microcontroller sends the RESET command (FFh) to the keyboard microcontroller. The RESET command causes the keyboard microcontroller to execute its internal self-test routines (POR and BAS).

Upon receipt of all commands, except as specified below, the keyboard responds with an acknowledge signal or byte (FAh) indicating that it received the command. Thus, in step 70, the test unit waits for the acknowledge signal following transmission of the RESET command. If no signal is received within a specified time (step 72), the microcontroller enters into an error condition in which the word "Fail" is displayed to the operator (step 74) and the microcontroller enters an endless loop (step 76). The endless loop typically will be interrupted by a reset signal generated when the operator actuates the push-button switch on the test unit, which will cause the test sequence to begin again. This procedure on failure of the test unit to receive an acknowledge signal is used commonly in this program and will be referred to hereafter simply as the "Error Condition."

Figure 3A:
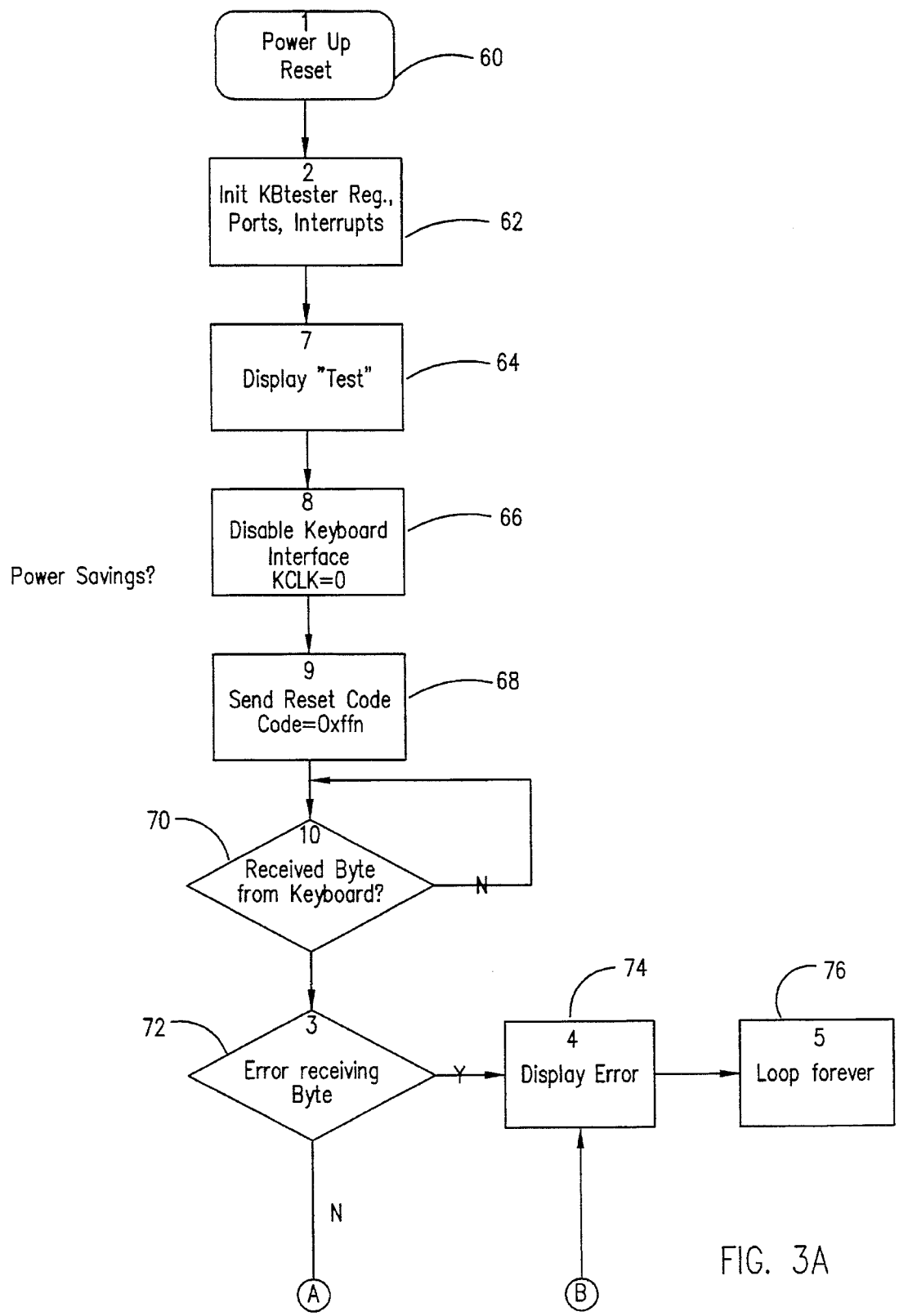
Figure 3B:
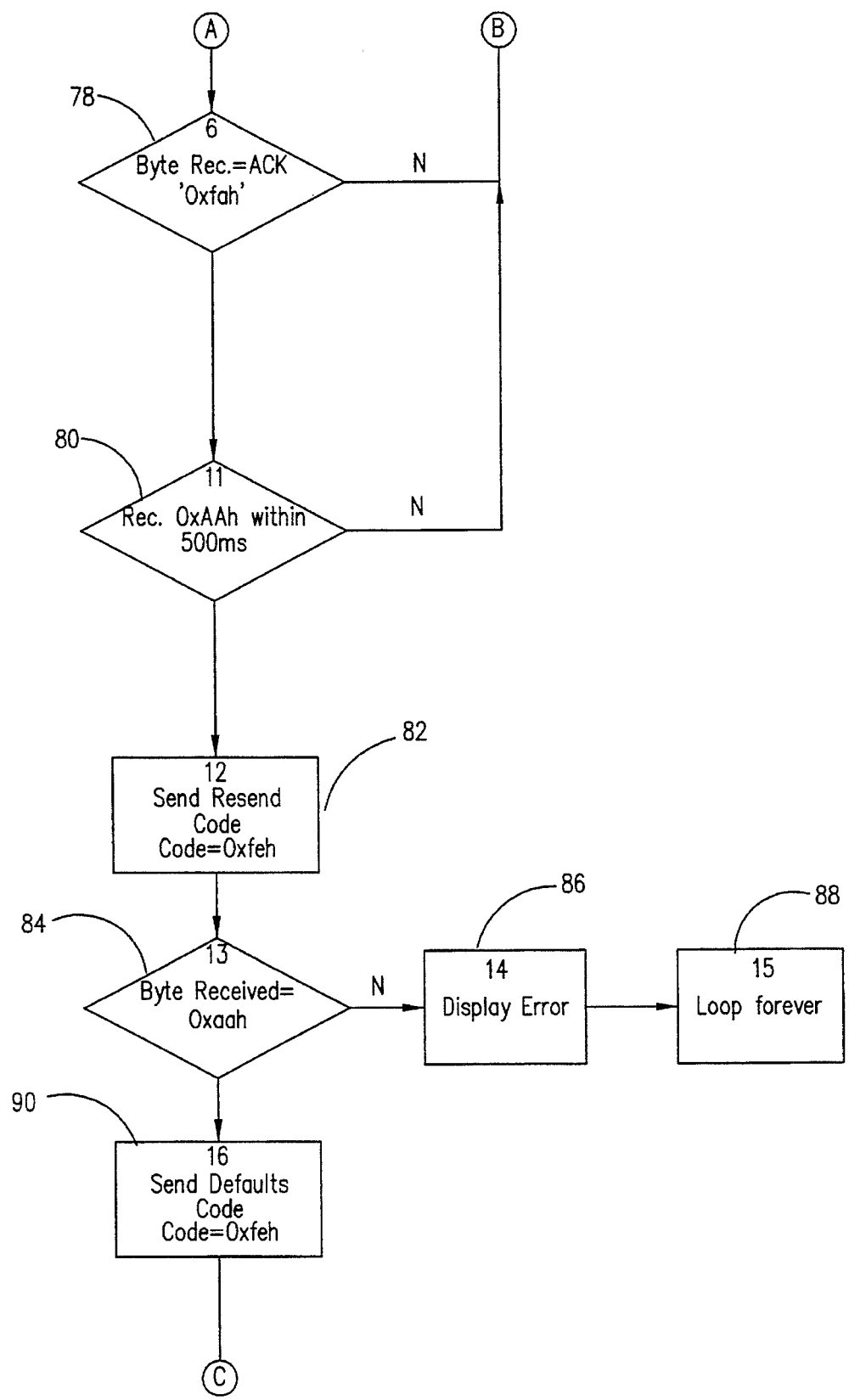

If a signal is returned by the keyboard to the test unit in a timely fashion, the test unit checks to see if it is a proper acknowledge signal (FAh) (step 78) (FIG. 3B). If the byte received is anything other than an acknowledge byte, the test unit enters into the Error Condition. If the byte received is an acknowledge byte, the test unit then proceeds to the next step. The procedure of checking for an acknowledge signal following transmission of a command, and if the acknowledge is not timely or properly received, triggering an Error Condition, appears frequently in the description that follows and will be referred to hereafter as the "Acknowledge Procedure."

After the acknowledge byte is received in the test unit, indicating that the RESET command was received by the keyboard, the test unit waits for the BAT completion code (AAh) (step 80). Failure to receive the BAT completion code triggers the Error Condition.

On receipt of the BAT completion code, the test unit sends the RESEND command (FEh) to the keyboard (step 82). The RESEND command instructs the keyboard to send again the last byte transmitted. Accordingly, the test unit awaits receipt of the BAT completion code (AAh) once again (step 84). If it is not timely or properly received, the test unit triggers the Error Condition (steps 86, 88).

Figure 3C:
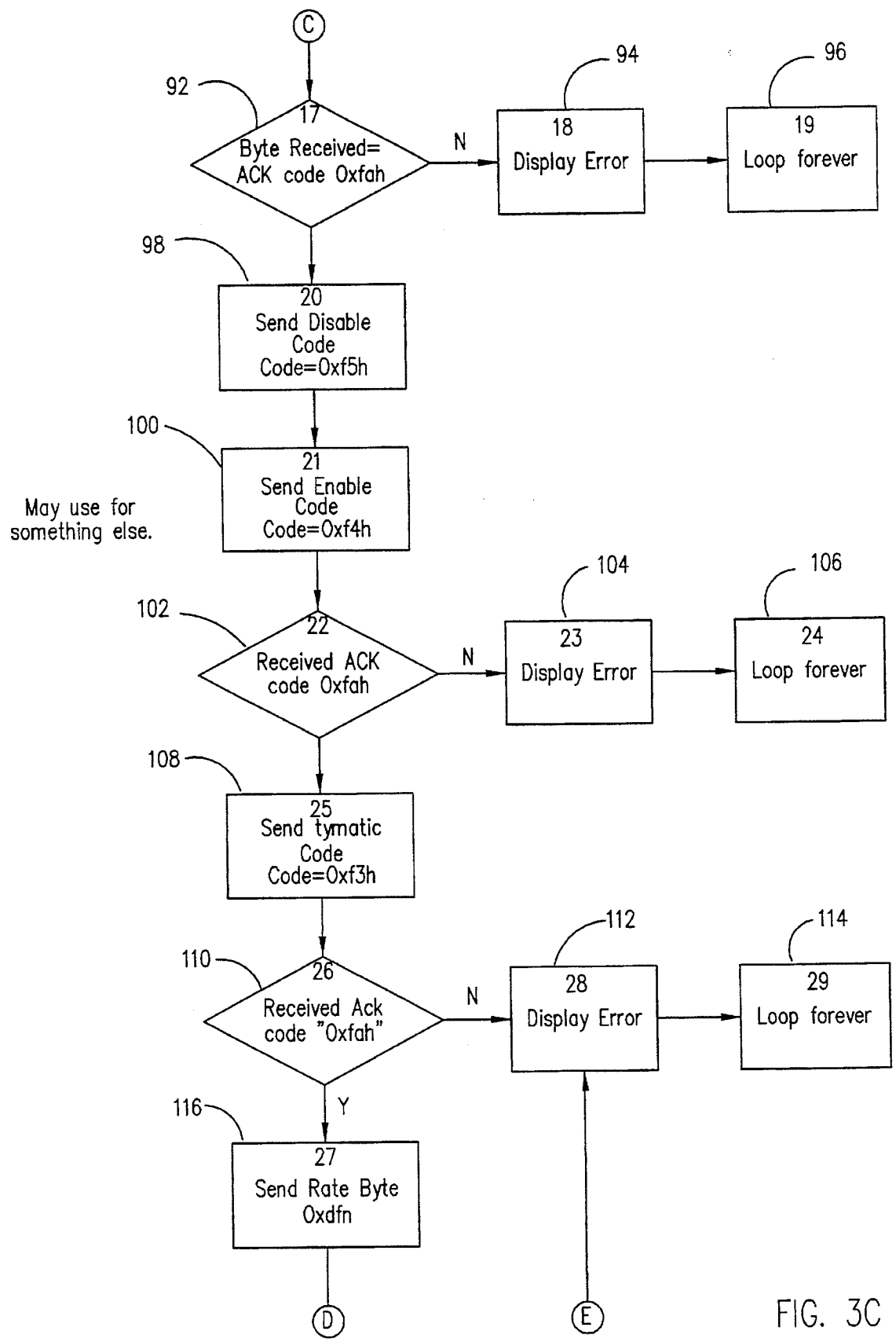

On receipt of the BAT completion code for the second time, the test unit sends the SET DEFAULT command (F6h) (step 90). This command resets all conditions to the power-on default state, with the keyboard operating under scan code set 2 at a typematic rate of 500 msec. The test unit then executes the Acknowledge Procedure (steps 92, 94, 96) (FIG. 3C).

On receipt of the acknowledge byte, the test unit sends the DISABLE command (F5h) (step 98), which disables the keyboard. Thus, if the command is properly received by the keyboard, the keyboard does not respond with an acknowledge byte.

Accordingly, the test unit proceeds to send the ENABLE command (F4h) (step 100) and then executes the Acknowledge Procedure (steps 102, 104, 106), as explained above.

Figure 3D:
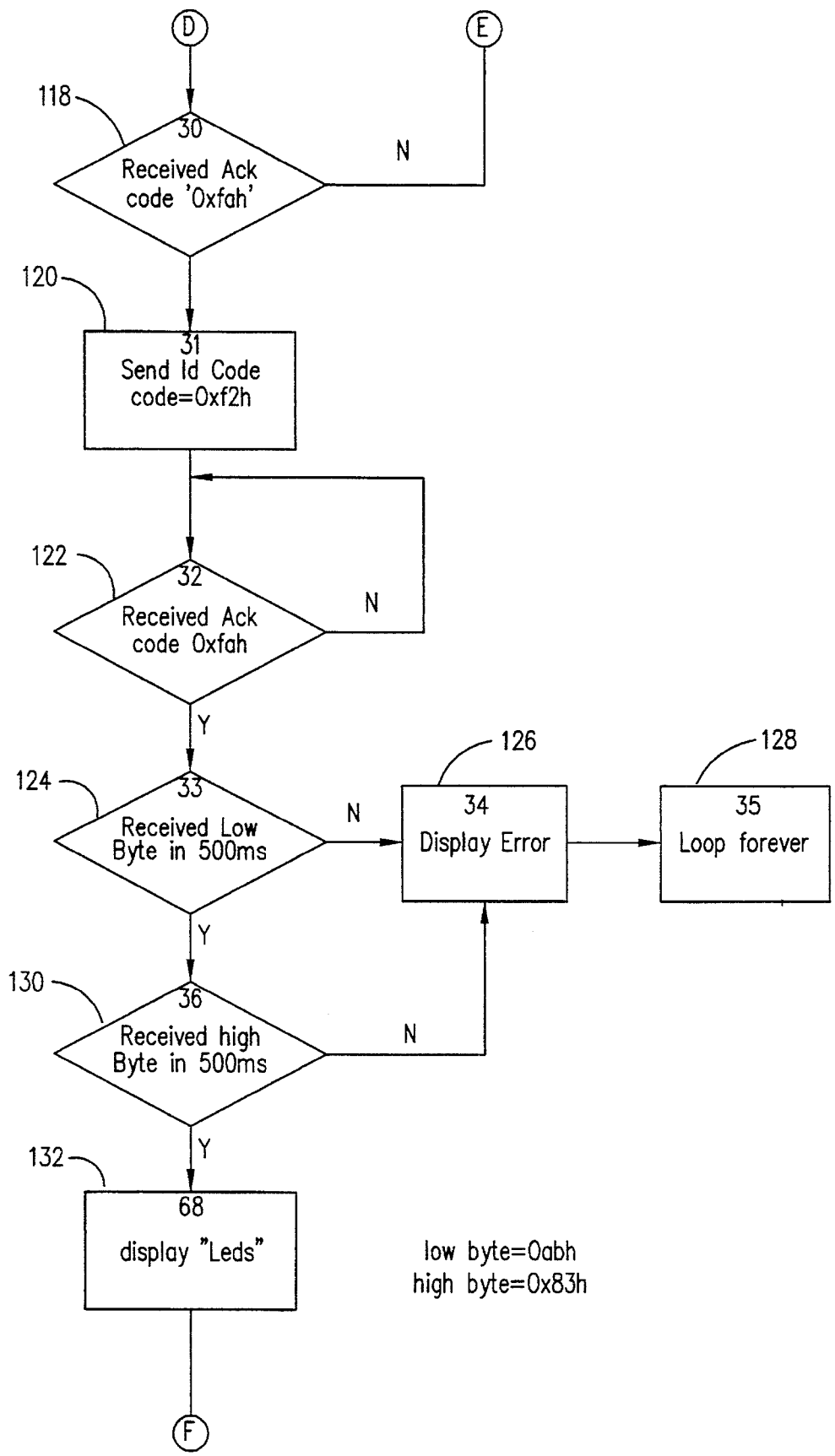
Figure 3E:
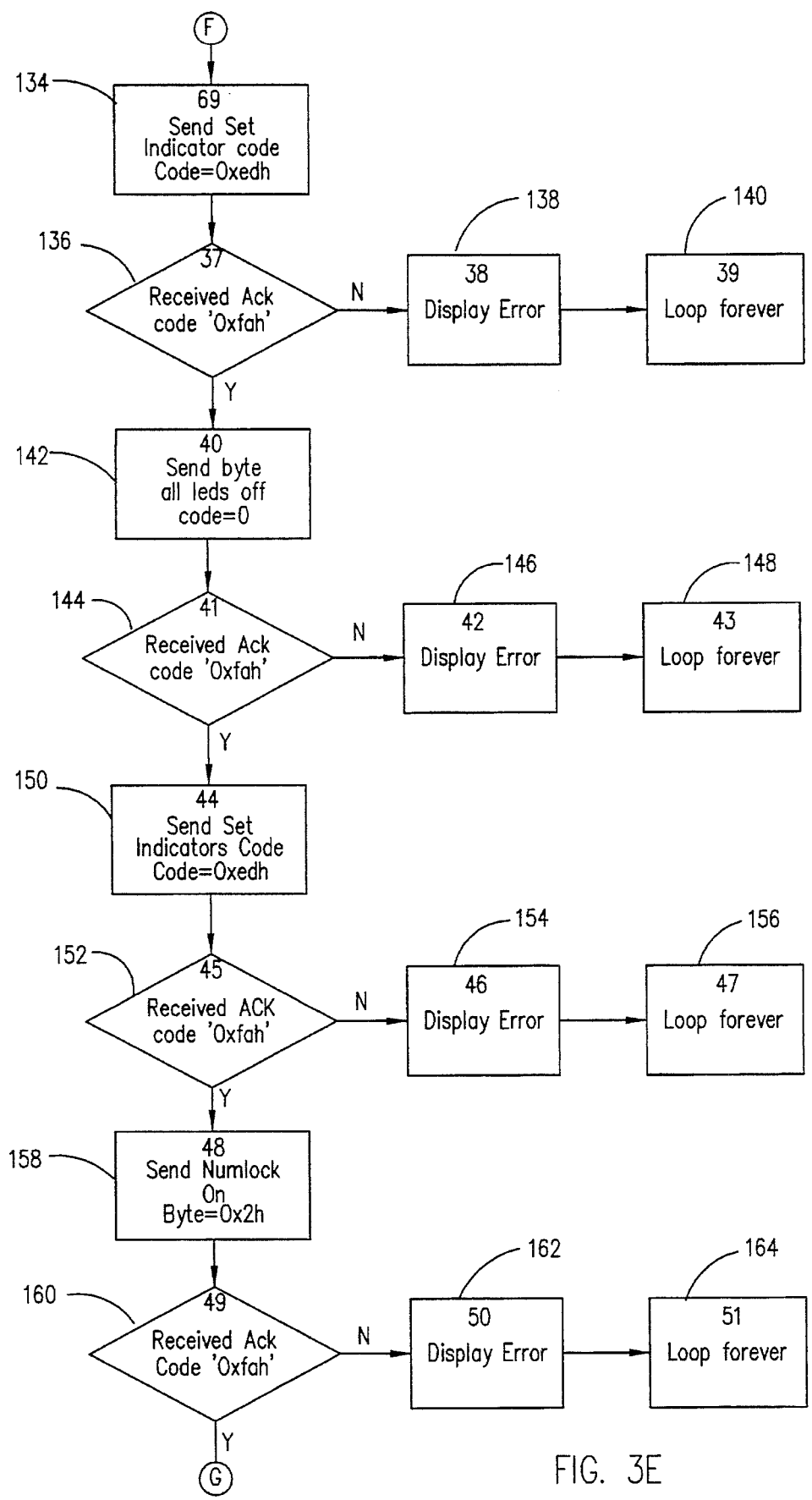
Figure 3F:
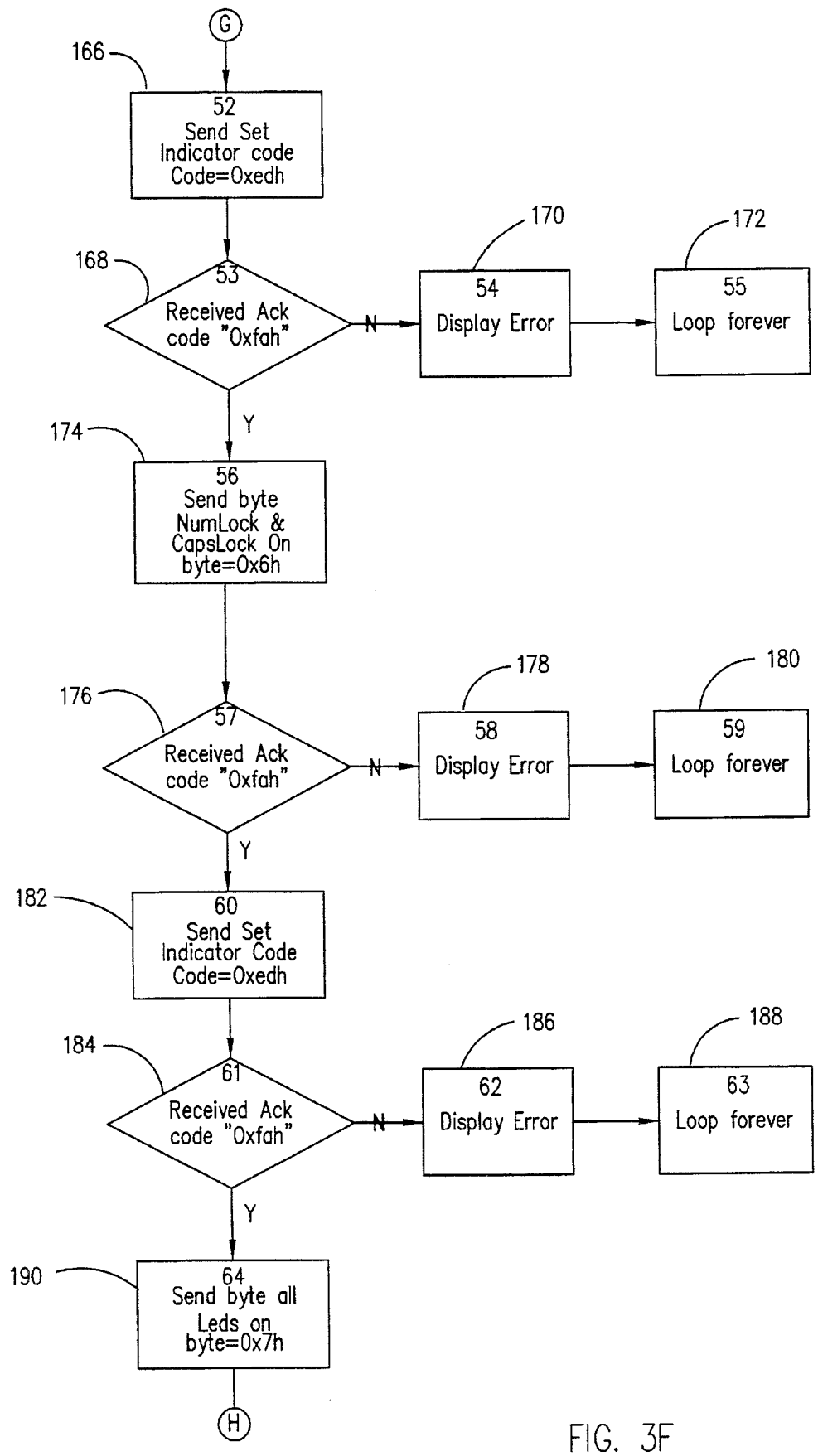

On receipt of the acknowledge byte, the test unit sends the SET TYPEMATIC command (F3h) (step 108) and then executes the Acknowledge Procedure (steps 110, 112, 114). The SET TYPEMATIC command instructs the keyboard to standby for a typematic rate/delay byte to follow. Thus, on receipt of the acknowledge byte, the test unit transmits a rate/delay byte (DFh) (step 116) and executes the Acknowledge Procedure (steps 118, 112, 114) (FIG. 3D).

Next the test unit sends the READ ID command (F2h) (step 120), which instructs the keyboard to send its two identification bytes. The test unit then awaits receipt of the low byte (step 124) followed by the high byte (step 130). Each byte must be correctly received within 500 msec or the test unit enters the Error Condition (steps 126, 128).

Next the test unit tests the three keyboard LEDs "Num Lock," "Caps Lock," and "Scroll Lock"). First, the test unit displays the letters "LEDs" in the test unit display (step 132) to direct the operator's attention to the keyboard LEDs. Then the test unit sends the SET INDICATOR command (EDh) (step 134) (FIG. 3E) and executes the Acknowledge Procedure (steps 136, 138, 140). The SET INDICATOR command instructs the keyboard to standby for a masking byte that will set the on/off condition of the three LEDs.

On receipt of the acknowledge byte, the test unit sends byte 00h (step 142), which turns all three LEDs off, and executes the Acknowledge Procedure (steps 144, 146, 148). Then the test unit transmits the SET INDICATOR command a second time (step 150), executes the Acknowledge Procedure (steps 152, 154, 156), sends byte 02h (step 158), which turns on the "Num Lock" LED, and again executes the Acknowledge Procedure (steps 160, 162, 164).

Then the test unit transmits the SET INDICATOR command a third time (step 166) (FIG. 3F), executes the Acknowledge Procedure (steps 168, 170, 172), sends byte 06h (step 174), which turns on the "Num Lock" and the "Caps Lock" LEDs, and again executes the Acknowledge Procedure (steps 176, 178, 180).

Figure 3G:
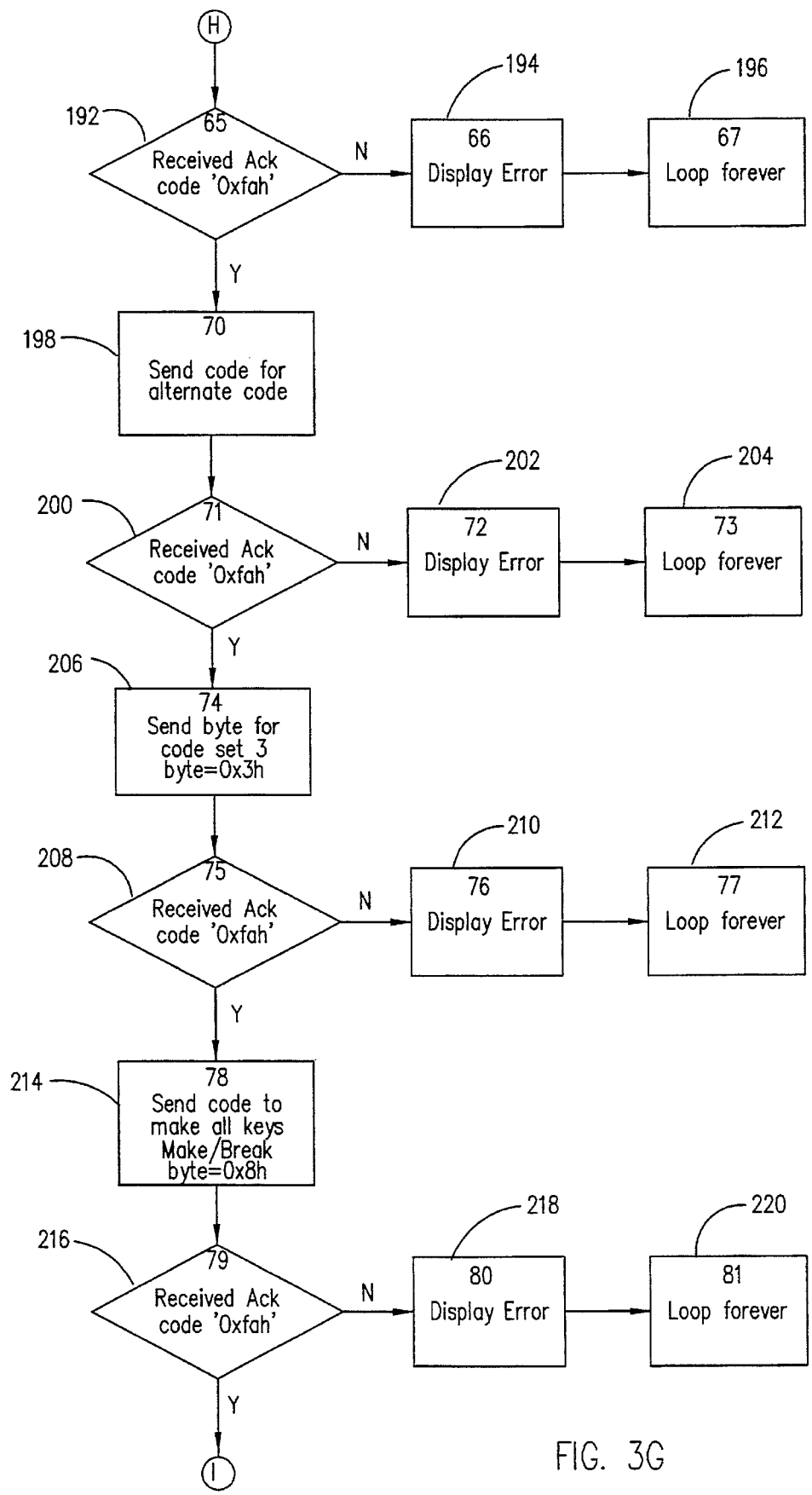

Then the test unit transmits the SET INDICATOR command a fourth time (step 182), executes the Acknowledge Procedure (steps 184, 186, 188), sends byte 07h (step 190), which turns on the "Num Lock," the "Caps Lock," and the "Scroll Lock" LEDs, and again executes the Acknowledge Procedure (steps 192, 194, 196) (FIG. 3G). While the LED tests are being executed, the operator can observe the three LEDs on the keyboard progressively light up and finally stay lighted.

Next, the test unit sends the ALTERNATE CODE command (FAh) and then executes the Acknowledge Procedure (steps 200, 202, 204). This is followed then by the byte for scan code set 3 (03*h*) (step 206), the Acknowledge Procedure (steps 208, 210, 212), the command SET ALL KEYS to set make/break scan codes (F8*h*) (step 214), and the Acknowledge Procedure (steps 216, 218, 220). These commands set up the keyboard in scan code set 3 in preparation for the key closure tests to follow. Finally, the test unit sends the ENABLE command (F4*h*) (step 222) (FIG. 3H), which causes the keyboard to begin scanning the keys. The test unit then executes the Acknowledge Procedure (steps 224, 226, 228).

In step 230, the test unit pulls the KCLK line low to prevent the keyboard from transmitting to the test unit while the test unit prepares to execute the key closure tests.

The key closure tests commence with initializing a Table Select pointer (step 232). The key closure tests involve use of an array that is essentially 5 bytes by 101 bytes, being five bytes for each of 101 keys on the keyboard. The five bytes for each key include four display bytes and a key-make code byte. Because the COP8780 used to construct the preferred embodiment has a limited table pointer that will not accommodate an array this size, it was divided into four separate tables. Thus, in order to identify the five bytes for each succeeding key, the test unit must maintain a Table Select pointer, as well as a pointer within each table. Step 232 sets the Table Select pointer to 00*h*.

In steps 234, 236, 238 (FIG. 3I), and 240, the test unit progressively tests the magnitude of the Table Select pointer against the minimum magnitude needed to enter each table. With the Table Select pointer set at 00*h*, it will pass through all four test steps to Table 1, the lowest order table. In step 242, the test unit will increment the Table 1 pointer to identify the first five bytes in Table 1 as being the bytes of interest.

Next, the first four bytes (the "display bytes") of the five-byte table entry are loaded into the four-character display (step 244). This causes the display to indicate to the operator the identity of the key to be tested. The test unit then enters into a loop, waiting for the operator to press the indicated key (step 246). When a byte is received, it is compared to the fifth byte (the key-make code) of the five-byte table entry to determine if it is the key-make code for the key of interest (step 248). If the byte received is not the proper key-make code, the test unit enters the Error Condition (steps 250, 252).

Figure 3H:
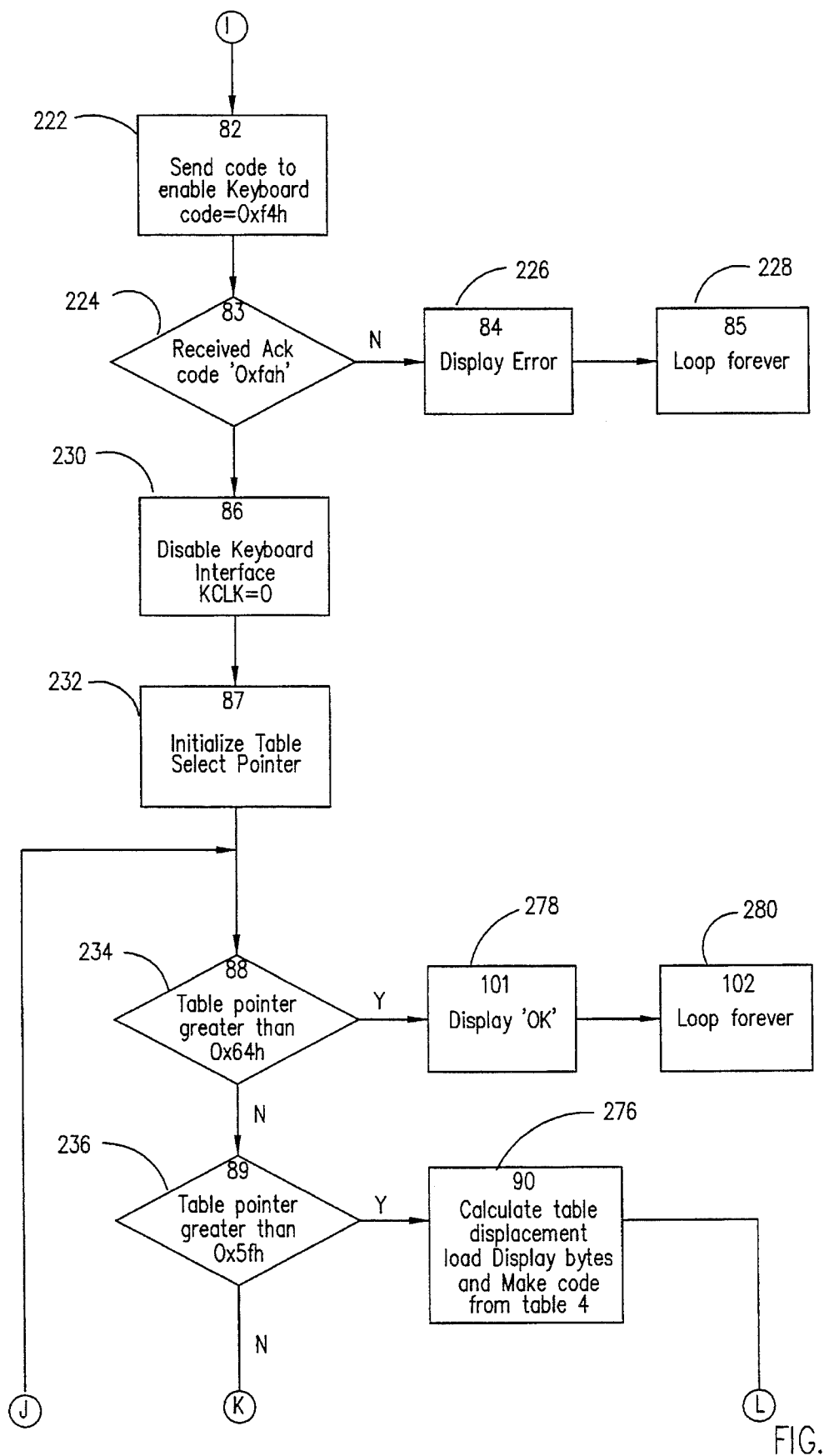
Figure 31:
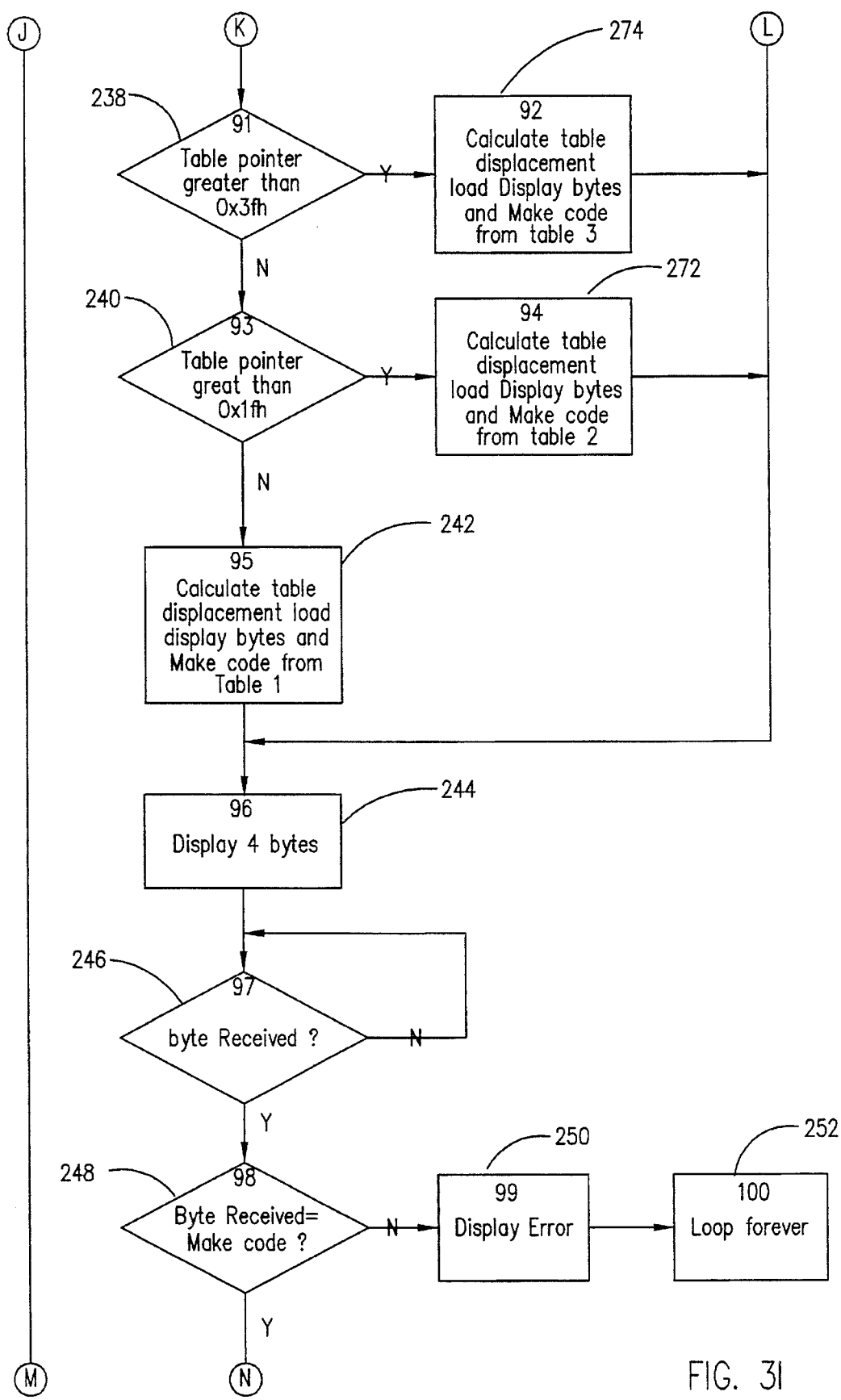
Figure 3J:
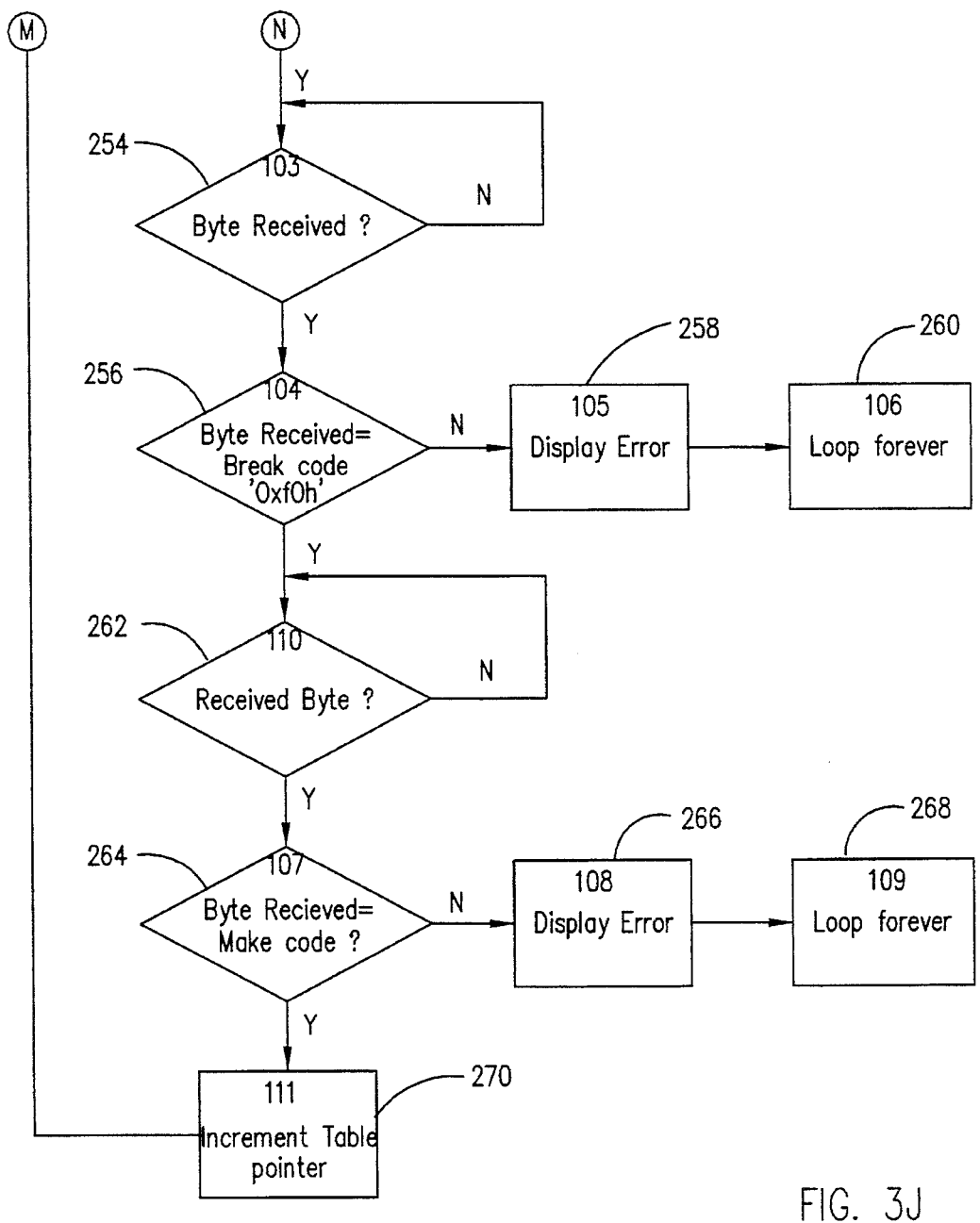

If the byte received is the proper key-make code, the test unit waits for a second byte (step 254) (FIG. 3J). The second byte then is tested against the key-break code (F0*h*), which is the same for all keys. Failure to receive the proper key-break code triggers the Error Condition (steps 258, 260).

If the byte received is the proper key-break code, the test unit waits for the third byte (step 262). The third byte then is tested against the key-make code once again, as determined earlier from the fifth byte of the five-byte table entry. Failure to receive the proper key-break code triggers the Error Condition (step 266, 268). If the proper key-make code is received, the test unit increments the Table Select pointer by 01*h* and returns to step 234 (FIG. 3H), where the procedure continues as described above.

Thus, with the Table Select pointer incremented by 01*h*, the test unit will enter Table 1 a second time, increment the Table 1 pointer by five, and proceed to execute the steps as detailed below. Eventually, as the Table Select pointer is gradually incremented, the test unit will enter Table 2 (step 272) (FIG. 3I), then Table 3 (step 274), and finally Table 4 (step 276) (FIG. 3H). When the Table Select pointer finally reaches 64*h*, all keys have been tested successfully. The test unit identifies the magnitude 64*h* of the Table Select pointer in step 234 and causes the display to indicate that the keyboard passed the tests by displaying the letters "OK" (step 278). The test unit then enters a loop (step 280), awaiting a reset signal from the operator initiating the test sequence again at step 60 (FIG. 3A). This completes the description of the method of operation of the test unit.

Thus, the present invention provides a simple, relatively inexpensive, keyboard test unit that is compact, lightweight, and can be carried in the palm of one's hand. One having skill in the art will appreciate that the foregoing description of attributes and advantages to be experienced in constructing the apparatus or practicing the method described herein is not exhaustive of all features of the present invention. It will be appreciated that modifications for the aforedescribed preferred embodiment of the invention can be made without departing in substance from the principles of the invention.

For example, one having skill in the art will appreciate that the test unit described herein is designed for a go/no-go test that is useful for testing incoming keyboards purchased from a vendor. It is apparent that the microcontroller of the present invention could be programmed to display error messages that are distinct for each type of failure tested by the unit, making the unit more useful to a keyboard manufacturer. Similarly, one could enhance the digital display or other functional features of the test unit, all without departing from the spirit of the invention.

What is claimed is:

1. A hand-held keyboard testing unit, comprising:

an enclosure;

a keyboard connector jack attached to said enclosure, said jack arranged to receive a keyboard connector on a cable extending from the keyboard;

a controller within said enclosure, said controller being programmed solely to test the functional capability of the keyboard; and wherein said enclosure has a volume of no more than sixty cubic inches and a weight of no more than one pound to permit the keyboard testing unit to be hand-held.

2. A hand-held testing unit according to claim 1 wherein the program executed by said controller comprises the steps of:

sending commands to the keyboard and verifying that the keyboard transmits proper responses to the commands; and verifying that the keyboard transmits proper key-make and key-break codes when each key on the keyboard is depressed and then released.

3. A hand-held test unit for connection to a keyboard, said test unit including a microcontroller programmed to test the functions of a keyboard, said program including the following steps:

causing the keyboard to execute its internal self-test routines;

causing the keyboard to execute a plurality of commands typically generated by a system unit on a personal computer; and cooperating with an operator to conduct a key closure test for each key on the keyboard.

4. A hand-held test unit according to claim 3, wherein said step of causing the keyboard to execute its self-test routines includes sending a RESET command (FFh) to cause execution of a basic assurance test.

5. A hand-held test unit according to claim 3, wherein said step of causing the keyboard to execute a plurality of commands comprises the following steps:

sending a RESEND command (FEh) and checking for receipt of the byte last transmitted by the keyboard;

sending a DEFAULT command (F6h) and checking for receipt of an acknowledge byte (FAh) from the keyboard;

sending a DISABLE command (F5h);

sending an ENABLE command (F4h) and checking for receipt of an acknowledge byte (FAh) from the keyboard;

sending a SET TYPEMATIC command (F3h) and checking for receipt of an acknowledge byte (FAh) from the keyboard; and sending a READ ID command (F2h) and checking for receipt of an acknowledge byte (FAh) and two keyboard identification bytes from the keyboard.

6. A hand-held test unit according to claim 5, wherein said step of causing the keyboard to execute a plurality of commands further comprises the steps of checking proper operation of three keyboard LEDs, as follows:

sending a SET INDICATOR command (EDh) and checking for receipt of an acknowledge byte (FAh) from the keyboard;

sending a byte (00h) to turn all LEDs off and checking for receipt of an acknowledge byte (FAh) from the keyboard;

sending a SET INDICATOR command (EDh) and checking for receipt of an acknowledge byte (FAh) from the keyboard;

sending a byte (02h) to turn a "Num Lock" LED on and checking for receipt of an acknowledge byte (FAh) from the keyboard;

sending a SET INDICATOR command (EDh) and checking for receipt of an acknowledge byte (FAh) from the keyboard;

sending a byte (06h) to turn the "Num Lock" LED and a "Caps Lock" LED on and checking for receipt of an acknowledge byte (FAh) from the keyboard;

sending a SET INDICATOR command (EDh) and checking for receipt of an acknowledge byte (FAh) from the keyboard; and sending a byte (07h) to turn the "Num Lock" LED, the "Caps Lock" LED, and a "Scroll Lock" LED on and checking for receipt of an acknowledge byte (FAh) from the keyboard.

7. A hand-held test unit according to claim 3, wherein said step of cooperating with an operator to conduct a key closure test for each key comprises for each key:

providing a digital display on said test unit;

displaying on the digital display an identity of the key;

waiting for the operator to depress the key and checking for the key-make code; and waiting for the operator to release the key and checking for the key-break code and then the key-make code once again.

8. A portable keyboard testing apparatus, comprising:

an enclosure small enough to hold in one hand;

a keyboard connector jack secured to a face of said enclosure, said jack arranged to receive a keyboard connector on a cable extending from a keyboard to be tested;

a controller housed within said enclosure, said controller being programmed to execute a sequence of keyboard tests;

a four-character digital display visible on a face of said enclosure and connected to said controller;

a switch secured to a face of said enclosure and connected to said controller, actuation of said switch causing said controller to begin a test sequence;

a power adapter connected to said controller, said power adapter supplying five volts of direct current; and an LED secured to a face of said enclosure, illumination of said LED indicating that power is being applied to said controller.

9. A portable keyboard testing apparatus according to claim 8 wherein the program executed by said controller comprises the steps of:

causing the keyboard to execute an internal self-test routine;

causing the keyboard to execute a plurality of commands; and conducting a key closure test for each key on the keyboard.

10. A portable keyboard testing apparatus according to claim 9, wherein said step of causing the keyboard to execute an internal self-test routine includes sending a RESET command (FFh) to cause execution of a basic assurance test.

11. A portable keyboard testing apparatus according to claim 9, wherein said step of causing the keyboard to execute a plurality of commands comprises the following steps:

sending a RESEND command (FEh) and checking for receipt of the byte last transmitted by the keyboard;

sending a DEFAULT command (F6h) and checking for receipt of an acknowledge byte (FAh) from the keyboard;

sending a DISABLE command (F5h);

sending an ENABLE command (F4h) and checking for receipt of an acknowledge byte (FAh) from the keyboard;

sending a SET TYPEMATIC command (F3h) and checking for receipt of an acknowledge byte (FAh) from the keyboard; and sending a READ ID command (F2h) and checking for receipt of an acknowledge byte (FAh) and two keyboard identification bytes from the keyboard.

12. A portable keyboard testing apparatus according to claim 11, wherein said step of causing the keyboard to execute a plurality of commands further comprises the steps of checking proper operation of three keyboard LEDs, as follows:

sending a SET INDICATOR command (EDh) and checking for receipt of an acknowledge byte (FAh) from the keyboard;

sending a byte (00h) to turn all LEDs off and checking for receipt of an acknowledge byte (FAh) from the keyboard;

sending a SET INDICATOR command (EDh) and checking for receipt of an acknowledge byte (FAh) from the keyboard;

sending a byte (02h) to turn a "Num Lock" LED on and checking for receipt of an acknowledge byte (FAh) from the keyboard;

sending a SET INDICATOR command (EDh) and checking for receipt of an acknowledge byte (FAh) from the keyboard;

sending a byte (06h) to turn the "Num Lock" LED and a "Caps Lock" LED on and checking for receipt of an acknowledge byte (FAh) from the keyboard;

sending a SET INDICATOR command (EDh) and checking for receipt of an acknowledge byte (FAh) from the keyboard; and sending a byte (07h) to turn the "Num Lock" LED, the "Caps Lock" LED, and a "Scroll Lock" LED on and checking for receipt of an acknowledge byte (FAh) from the keyboard.

13. A portable keyboard testing apparatus according to claim 9, wherein said step of conducting a key closure test for each key comprises for each key:

displaying on said digital display an identity of the key;

waiting for an operator to depress the key and checking for the key-make code; and waiting for the operator to release the key and checking for the key-break code and then the key-make code once again.

* * * * *